United States Patent Office

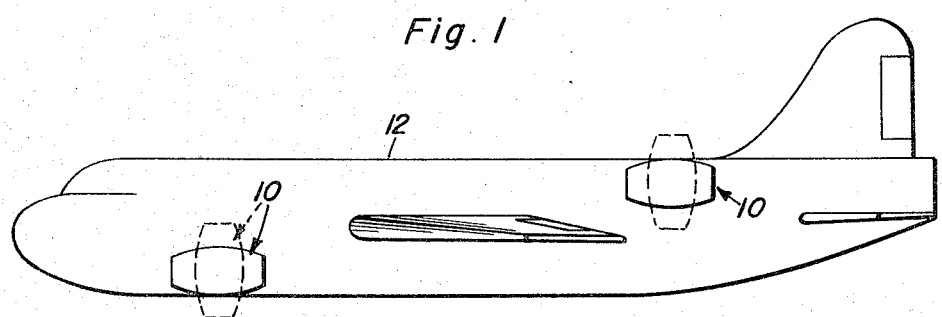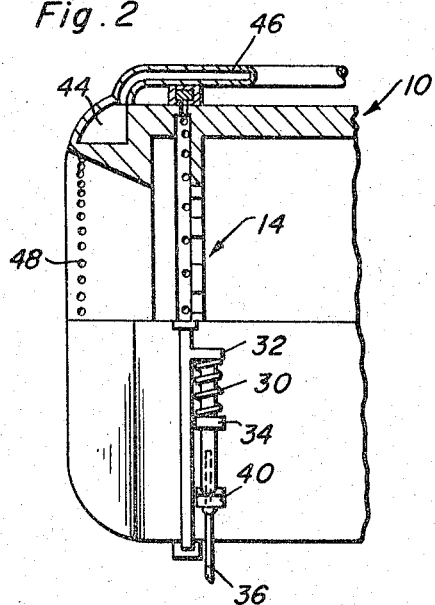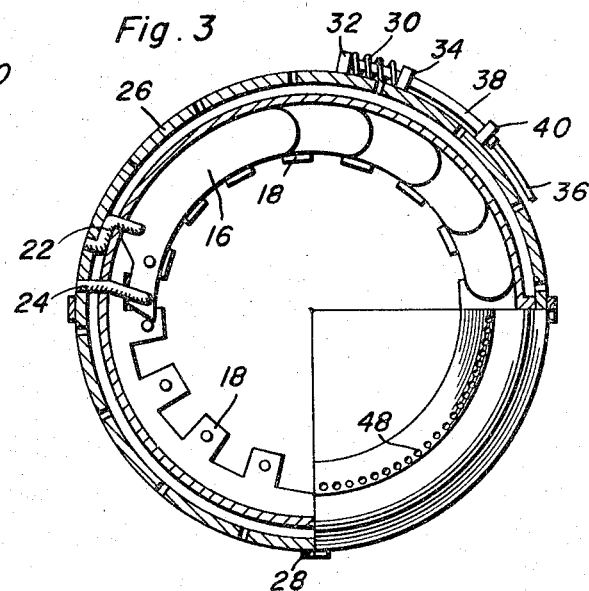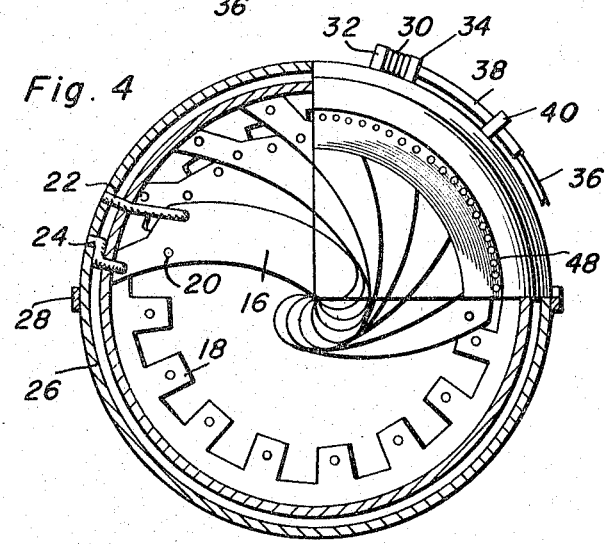
Shao-Tang Lee
INVENTOR.

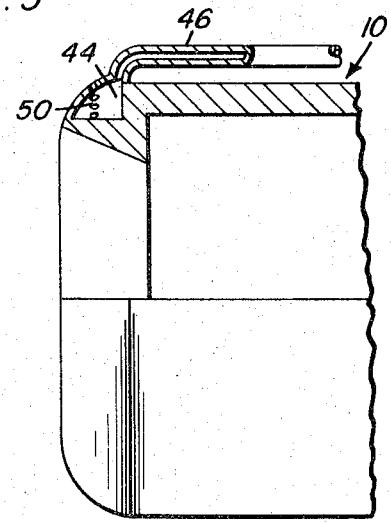
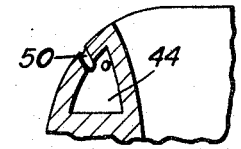
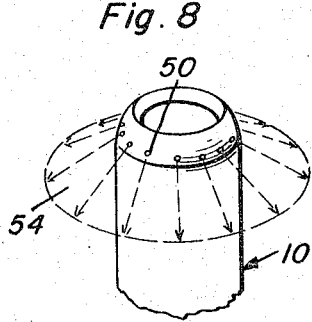
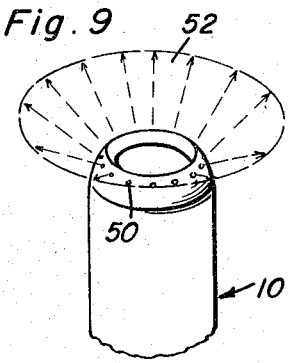
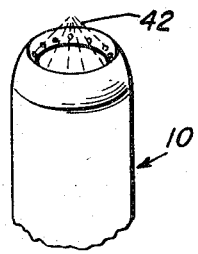

3,298,637
Patented Jan. 17, 1967

3,298,637
ENGINE INLET PROTECTIVE SCREEN
ARRANGEMENT
Shao-Tang Lee, 25 Chi-kuang St.,
Taichung, Taiwan, China
Original application June 15, 1964, Ser. No. 375,391. Divided and this application Sept. 22, 1965, Ser. No. 489,125
12 Claims. (Cl. 244—53)

This application is a division of application Serial No. 375,391, filed June 15, 1964, which is in turn a continuation-in-part of application Serial No. 219,652, filed August 27, 1962, now Patent No. 3,165,280. The invention set forth herein generally relates to jet engines, and is more particularly concerned with means for providing a protective barrier at the intake end thereof.

It is a primary object of the instant invention to provide means for selectively establishing a temporary barrier at the inlet end of a jet engine so as to exclude, to a large degree, the entry of foreign matter such as water or dust.

In conjunction with the above object, it is also an object of the instant invention to utilize a fluid, and more specifically gas or air, barrier, either alone or in conjunction with selectively closable shutter blades, so as to provide the protective means for the jet intake end.

Further, it is an object of the instant invention to provide means whereby a protective screen or barrier can be formed about the intake end of a jet engine without requiring an actual closing of the end in a manner which would shut off the normal supply of air.

Basically, in achieving the above objects, it is contemplated that a conventional jet engine be modified about the intake end thereof so as to include an encircling enlarged hollow conduit having a continuous series of discharge holes therein, this series of holes being either directed inwardly or outwardly relative to the intake end whereby, upon the discharge of pressurized air therethrough, an air or fluid screen is provided so as to effectively exclude any dust and/or water which might be splashed up by the thrust of the engine when, for example, taking off vertically from soft ground or water. In addition, it is contemplated that the engine also be provided with a series of selectively closable shutter blades for effecting a further closing of the intake end. Such a shutter, depending upon the particular condition under which the aircraft is to be used, would be optional in those engines wherein the fluid barrier is formed outwardly of the intake end as compared to those engines wherein the fluid barrier is formed directly over the intake end.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a schematic side view of an aircraft illustrating rotatably mounted jet engines;

FIGURE 2 is an enlarged side view of the forward or intake portion of a jet engine having the features of the instant invention incorporated therein, portions of this view being broken away for purposes of illustration;

FIGURE 3 is a transverse view of the head of the jet illustrating the shutter in its open position and one arrangement of air discharge apertures or holes;

FIGURE 4 is a view similar to FIGURE 3 illustrating the shutter in its closed position;

FIGURE 5 is a view similar to FIGURE 2 with the shutter construction removed and illustrating a modified arrangement of air discharge holes;

FIGURE 6 is a partial detail view illustrating an outwardly and upwardly directed arrangement of the air discharge holes;

FIGURE 7 is a view similar to FIGURE 6 illustrating an outwardly and downwardly directed arrangement of the discharge holes;

FIGURE 8 is a schematic view illustrating the fluid barrier formed utilizing the hole arrangement shown in FIGURE 7;

FIGURE 9 is a schematic view illustrating the fluid barrier formed by the hole arrangement shown in FIGURE 6; and FIGURE 10 is a schematic view illustrating the fluid barrier achieved by utilizing the hole arrangement shown in FIGURES 2–4.

Referring now more specifically to the drawings, reference numeral 10 is used to generally designate a jet engine having the improvements of the instant invention incorporated therein. The jet engine 10 will normally be rotatably mounted on an aircraft 12 in any conventional manner so as to enable a vertical taking off of the aircraft in that the specific inventive features involved herein find particular, although not exclusive utility under vertical take-off conditions.

The jet engine 10, referring specifically to FIGURES 2–4, is provided at its intake or forward end with both a selectively closable shutter 14 and means for providing a fluid, and more particularly gas or air, barrier. These features are particularly useful as a means for excluding, from the engine 10, any dust and/or water which might be splashed up by the thrust of the jet when vertically taking off from soft ground or water. Inasmuch as the closing of the shutter 14 and the forming of the air barrier will effectively close off the intake end of the engine 10, it is contemplated that liquid air be introduced thereto in a conventional manner from any conventional source. Incidentally, this introduction of liquid air is in itself desirable inasmuch as the supply of air generally provided from the gliding movement of the plane during a conventional horizontal take-off is not available in a vertical take-off.

With particular reference to the shutter 14, it will be noted that a plurality of overlapping arcuate flat thin blades 16 are provided, each pivotally mounted, inward of the outer end thereof, to a rigid radially inwardly extending projection 18, this point of engagement being indicated by reference numeral 20. A first flexible cable 22 is fixed to each blade 16 forward of the pivot point 20, and a second flexible cable 24 is fixed to each shutter blade 16 rearward of the pivot point 20. Both of these cables 22 and 24 extend through apertures in the engine housing, and have the outer ends thereof fixedly locked to a ring 26 slidable about the exterior of the engine housing within guide rings or loops 28. The pair of cables 22 and 24 associated with each of the blades 16 are of a length whereby rotation of the control ring 26 in one direction will effect an opening pivotal movement of the shutter blades 16, while a rotational movement of the control ring 26 in the opposite direction will effect a pivotal movement of the shutter blades 16 in the opposite direction to a closed position.

The blades 16 are normally maintained in their open position through the biasing force of a compression coil spring 30 which is engaged between a fixed abutment 32 on the ring 26 and a second abutment 34 fixed to the motor housing. In order to effect the closing of the shutter 14, an elongated control cable 36 is provided, this control cable being fixed to an arcuate guide rod 38 which is in turn slidably received through a mounting lug 40, the fixed abutment 34, and the coil spring 30, and is secured, at the end thereof, to the ring abutment 32 whereby a pull on the control cable 36 will effect a movement of the ring 26 so as to produce a closing of the shutter 14. Upon release of the control cable 36, it will be appreciated that the spring 30 will effect an automatic opening of the shutter 14 through an outward pivoting of the shutter blades 16.

The particular fluid barrier or air tent used in this form of the invention is contemplated to completely close off the intake end of the jet motor 10 forward of the shutter 14 which is actually located inward of the extreme forward end of the motor 10. In order to achieve the desired air tent, which has incidently been schematically illustrated in FIGURE 10 and indicated by reference numeral 42, a circular hollow conduit or air chamber 44 is defined at the intake end of the jet engine 10. The conduit 44 is communicated with any suitable source of pressurized air or gas through the pipe 46. The discharge of air from the conduit 44 is through a series of inwardly and forwardly directed holes or apertures 48 completely thereabout. These holes 48 are directed radially inward and slightly forward of the intake end so as to provide for a meeting of the pressurized air streams, discharged therethrough at a generally central point, thereby forming a tent or barrier 42 over the intake end. Thus, the barrier 42 either in itself or in conjunction with the shutter 14 forms a means for excluding foreign matter from the engine.

In actual use, when a plane 12 is to take off under conditions whereby it is conceivable that foreign matter, such as dirt or water, will be drawn into the jet engines, the shutter 14 is closed, a gas barrier is formed through the discharge apertures 48 forward of the shutter 14, and liquid air is fed to the engines until a predetermined height is achieved. At this point, the shutters are opened and the gas barrier is cut off so as to enable the jet engine 10 to function in the normal manner.

With reference to FIGURES 5–9, it will be appreciated that the air barrier forming means has been modified slightly in that the air discharge apertures 50 are directed, substantially radially, outward about the intake end of the jet engine 10. These holes 50 can either be forwardly and upwardly inclined as illustrated in FIGURE 6 so as to form a bowl-shaped barrier 52, noting FIGURE 9, or slightly downwardly directed as in FIGURE 7 so as to form a collar-shaped barrier 54, noting FIGURE 8. In each instance, it is contemplated that sufficient holes 50 be provided and a sufficient pressure be utilized so as to form a substantially solid barrier about the intake end of the engine 10 so as to effectively restrain or block any dust or water which would tend to be thrown up by the engine during the take-off phase thereof. Incidentally, inasmuch as the barriers 52 and 54 are actually formed outward of the engine 10, the shutter 14 need not be provided in conjunction therewith, thereby not cutting off the regular air supply to the engine 10 and consequently avoiding the need for artificially providing such air such as in the nature of liquid air.

From the foregoing, it should be appreciated that a highly novel means has been provided for selectively producing a barrier at the intake end of a jet engine so as to exclude the introduction of foreign matter into the engine at the take-off stage. As detailed supra, this is basically achieved through the provision of an air seal or screen either directly over the intake end of the engine or radially outward and circumferentially about the intake end of the engine, with the air barriers so formed being supplemented, as desired, by a selectively closable shutter mounted within the intake end.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. For particular use as a jet engine adapted for vertical disposition in a VTOL aircraft, a jet engine comprising a forward intake end, a rear exhaust end, and means for selectively forming a fluid barrier circumferentially about the intake end so as to exclude foreign matter therefrom.

2. The construction of claim 1 wherein said means includes a hollow conduit surrounding said intake end, an inlet line for pressurized fluid communicated with said conduit for the introduction of pressurized fluid thereto, and a plurality of fluid discharge apertures in said conduit at generally equally spaced points completely about said intake end, said apertures being directed generally laterally of the intake end of the engine whereby fluid discharged therethrough will form a substantially circular fluid barrier about the intake end.

3. The construction of claim 2 wherein said apertures are directed generally radially outward peripherally about said intake end, so as to form an outwardly extending fluid collar thereabout.

4. The construction of claim 1 including selectively operable shutter means mounted within the intake end of said engine inward of the fluid barrier forming means for closing said intake end, and auxiliary air supply means for supplying air to said engine when said shutter means is closed.

5. The construction of claim 2 wherein said apertures are directed generally radially inward across said intake end so as to form a fluid cover thereover, selectively operable shutter means mounted within the intake end of said engine inward of the fluid barrier forming means for closing said intake end, and auxiliary air supply means for supplying air to said engine when said shutter means is closed.

6. The construction of claim 3 wherein said outwardly directed apertures are angled slightly rearward relative to said intake end and toward said exhaust end.

7. The construction of claim 3 wherein said outwardly directed apertures are angled slightly forward relative to said intake end.

8. The construction of claim 4 wherein said engine includes a hollow cylindrical body, said shutter means comprising a plurality of overlapped generally coplanar elongated blades, means mounting said blades on the interior of said body for movement from a first position lying adjacent the interior surface of said body completely thereabout and defining an enlarged central opening, and a second position projecting generally radially inward from said body and closing said opening, and means for selectively and simultaneously moving said blades.

9. The construction of claim 8 wherein the means mounting said blades comprises a plurality of inwardly extending radial projections fixed to said body, and pivot means fixing each blade, inward of one end thereof, to a different projection, said means for moving said blades comprising a movable control mounted on said engine, means engaged between each blade, outward of the pivot means, and the control whereby movement of said control in one direction effects an inward swinging of said blades, and means engaged between each blade, inward of the pivot means, and the control whereby movement of said control in one direction effects an outward swinging of said blades.

10. A jet engine comprising a hollow cylindrical body, a forward intake end, a rear exhaust end, and selectively operable shutter means mounted within said body adjacent said intake end, said shutter means comprising a plurality of overlapped generally coplanar elongated blades, means mounting said blades on the interior of said body for movement from a first position lying adjacent the interior surface of said body completely thereabout and defining an enlarged central opening, and a second position projecting generally radially inward from said body and closing said opening, means for selectively and simultaneously moving said blades, and auxiliary air supply means for supplying air to said engine when said opening is closed.

11. The construction of claim 10 wherein the means mounting said blades comprises a plurality of inwardly extending radial projections fixed to said body, and pivot means fixing each blade, inward of one end thereof, to a different projection, said means for moving said blades comprising a movable control ring mounted on said engine, means engaged between each blade, outward of the pivot means, and the control ring whereby movement of said control ring in one direction effects an inward swinging of said blades, and means engaged between each blade, inward of the pivot means, and the control ring whereby movement of said control ring in one direction effects an outward swinging of said blades.

12. A vertically positionable jet engine comprising an upwardly directable intake end, a downwardly directable exhaust end, a conduit surrounding said intake end, an inlet line for pressurized fluid communicated with said conduit for the introduction of pressurized fluid thereto, and a plurality of fluid discharge apertures in said conduit at generally equally spaced points completely about said intake end, said apertures being directed generally laterally of the intake end of the engine whereby fluid discharged therethrough will form a substantially circular fluid barrier about the intake end.

References Cited by the Examiner

UNITED STATES PATENTS

| | | | |
|---|---|---|---|
| 2,915,262 | 12/1959 | Klein | 244—74 |
| 3,168,999 | 2/1965 | Warren et al. | 244—53 |

MILTON BUCHLER, *Primary Examiner.*

LARRY C. HALL, B. BELKIN, *Examiners.*